March 12, 1929.  J. F. KENNEDY  1,704,975
LIFE BELT
Filed June 28, 1928
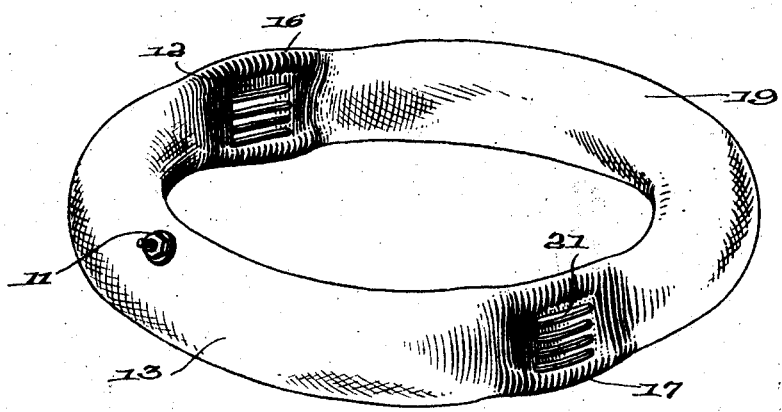
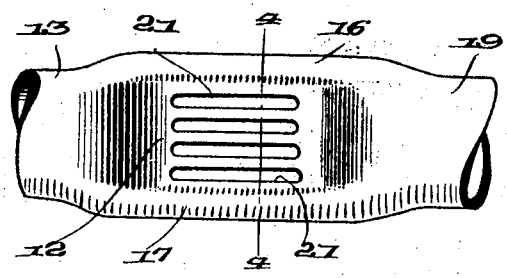
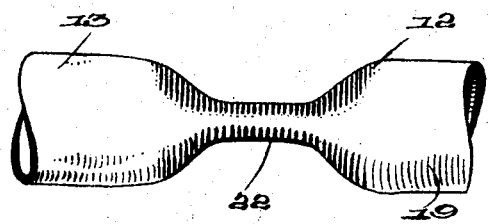
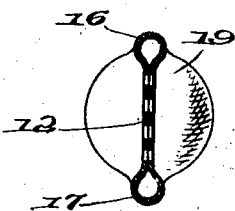
Inventor
JOHN FRANCIS KENNEDY,
By Hazell & Leech
Attorneys Patented Mar. 12, 1929.

1,704,975

UNITED STATES PATENT OFFICE.

JOHN FRANCIS KENNEDY, OF BALTIMORE, MARYLAND.

LIFE BELT.

Application filed June 28, 1928. Serial No. 288,953.

The present invention relates to life belts and is particularly directed to a life belt of special construction and features adapting it to fit the human body, and particularly to fit it comfortably under the arms.

The principal object of the invention is to provide a life belt of this character with front and rear inflatable portions both inflatable through a single valve located in the front portion, both portions being connected by a part of the belt of decreased thickness and increased flexibility.

Other and further objects of the invention will appear from the following description taken in connection with the accompanying drawings, which illustrate a preferred embodiment thereof, and in which:

Fig. 1 is a perspective view of a life belt embodying the present invention;

Fig. 2 is an enlarged detail view in side elevation, partly broken away, showing one form of the connecting portion joining the front and rear inflatable parts of the belt;

Fig. 3 is a similar view of a modified form of connecting portion; and

Fig. 4 is a central transverse sectional view taken on the line 4—4 of Fig. 2.

Referring in detail to the drawings, the life belt here shown is preferably originally made substantially in the form of a tore and resembles in structure the inner tube of an automobile tire and is provided with an inflating valve 11. Approximately one quarter of the way around the circumference in each direction from the valve 11 the walls of the tube are brought together, in which position they are cemented or preferably vulcanized, as indicated at 12 in Fig. 1. Above and below the cemented or vulcanized portion the walls are allowed to remain separate so that air forced into the front inflatable portion 13 will pass through channels 16 and 17 into the rear inflatable portion 19.

In order to still further increase the comfort of the wearer of the belt, the portions 22, at opposite sides of the tube, may be cut in toward the center of the tube, as shown in Fig. 3, this being the portion that fits below the arms of the wearer.

To increase the flexibility of the belt, the cemented or vulcanized connecting portions 12 may be slotted as indicated at 21, as in Figs. 1 and 2, thereby making the belt more readily adaptable to the size of the wearer.

Various changes may be made in the structure as above disclosed without departing from the invention, as defined by the following claims.

What is claimed is:

1. A life belt comprising a substantially tore-shaped inflatable member provided with a valve, the sides of said member, at opposite points, being brought together, forming non-inflatable flexible portions leaving air passages therearound, each of said non-inflatable portions having openings therethrough.

2. A life belt comprising a substantially tore-shaped inflatable member provided with a valve, the sides of said member, at opposite points, being brought together, forming non-inflatable flexible portions leaving air passages therearound, each of said non-inflatable portions having a series of parallel elongated slots therethrough.

3. A life belt comprising a substantially tore-shaped inflatable member provided with a valve, the sides of said member, at opposite points, being brought together, forming non-inflatable flexible portions leaving air passages therearound, each of said portions being cut in at opposite sides.

4. A life belt comprising a substantially tore-shaped rubber tube, the inner sides of said tube, at two opposite points, being vulcanized together and being substantially flat, and having openings therethrough increasing their flexibility.

In testimony whereof I affix my signature.

JOHN FRANCIS KENNEDY.